Nov. 9, 1948.　　　　　J. S. REID　　　　　2,453,540
CARTRIDGE BELT
Filed Oct. 19, 1942　　　　　　　　　　　2 Sheets-Sheet 1
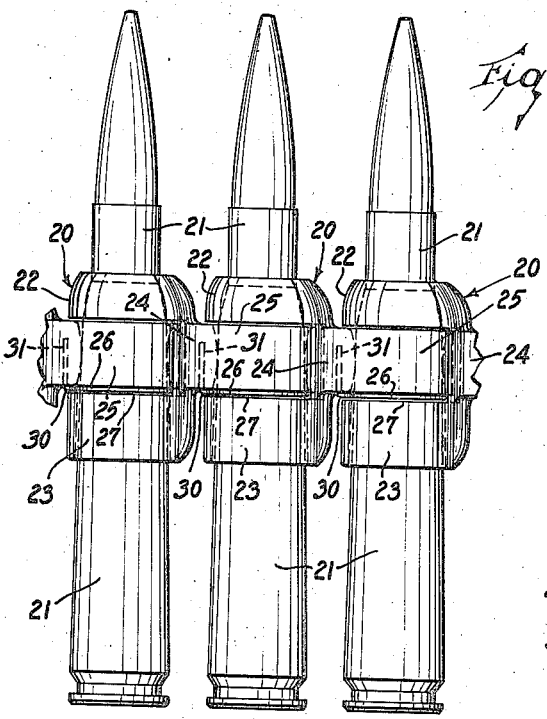
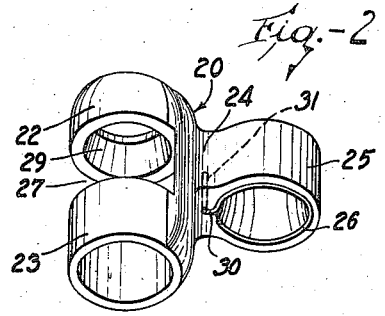
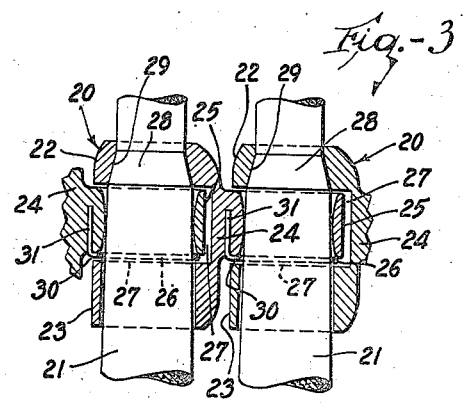
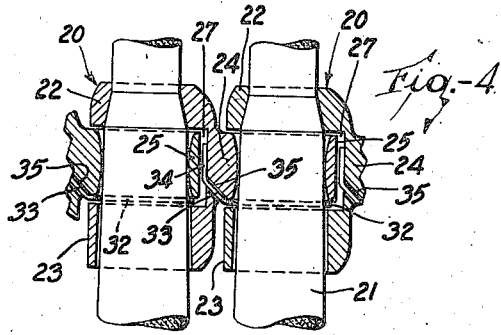
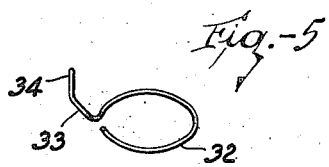
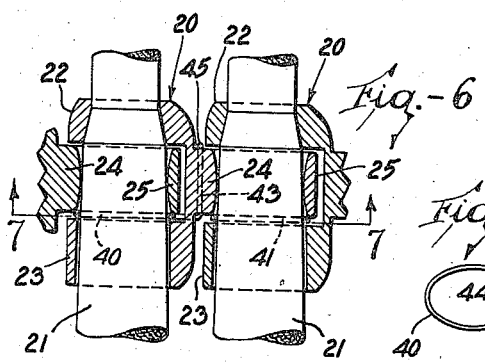
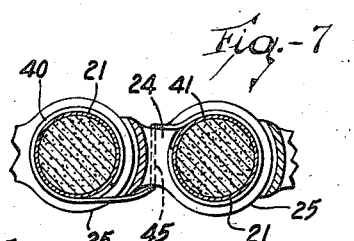
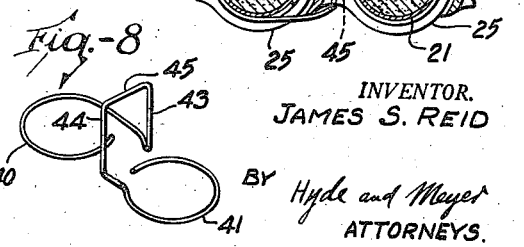
INVENTOR.
JAMES S. REID
BY Hyde and Meyer
ATTORNEYS.

Nov. 9, 1948.    J. S. REID    2,453,540
CARTRIDGE BELT
Filed Oct. 19, 1942    2 Sheets-Sheet 2
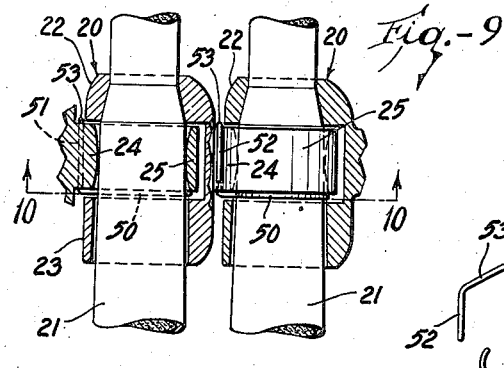
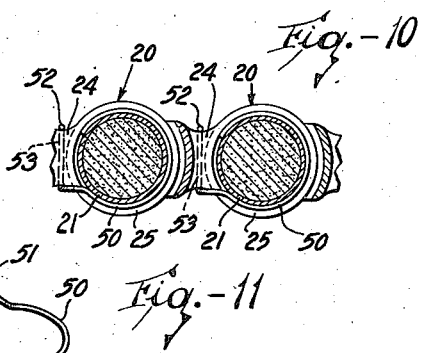
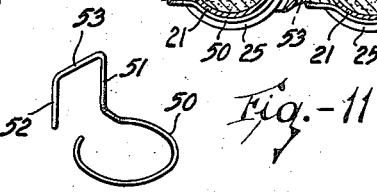
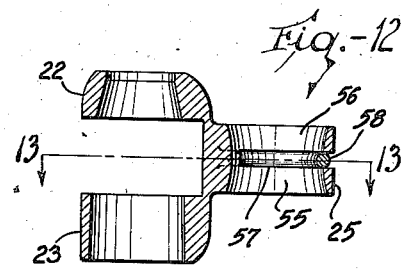
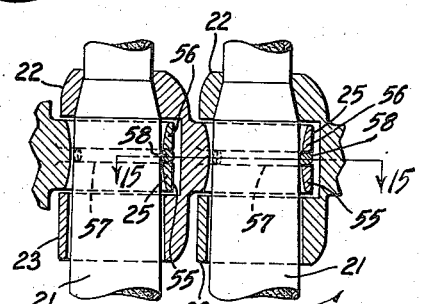
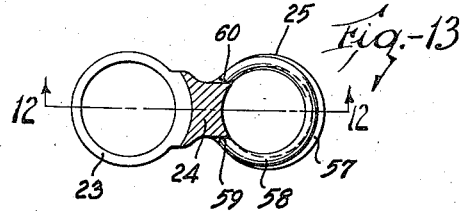
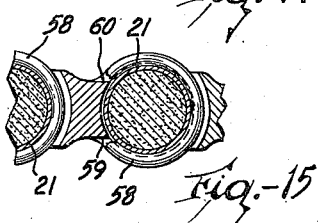
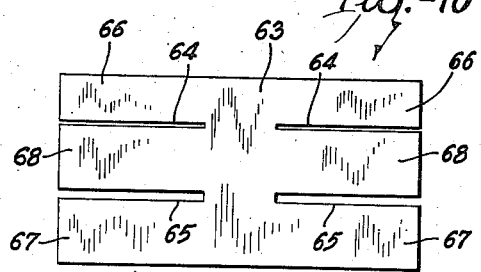
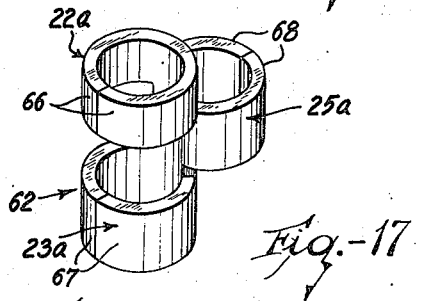
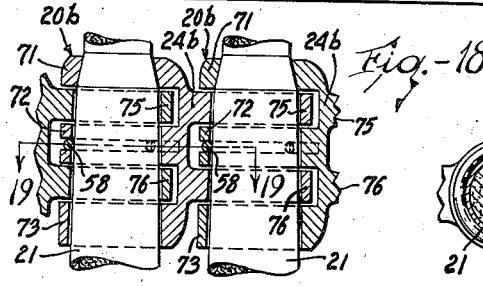
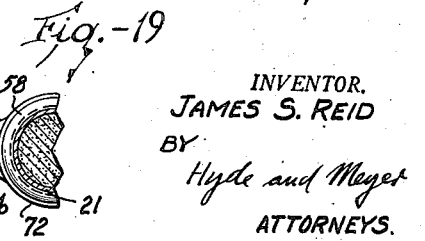
INVENTOR.
JAMES S. REID
BY
Hyde and Meyer
ATTORNEYS.

Patented Nov. 9, 1948

2,453,540

UNITED STATES PATENT OFFICE 2,453,540

CARTRIDGE BELT

James S. Reid, Cleveland Heights, Ohio, assignor to The Standard Products Company, Detroit, Mich., a corporation of Ohio Application October 19, 1942, Serial No. 462,571

3 Claims. (Cl. 89—35)

This invention relates to improvements in flexible cartridge belts, such as are used in the continuous feeding of cartridges into the chamber of a rapid firing automatic or semiautomatic gun. More particularly, the present invention relates to improvements in that type of cartridge belt having interfitting links hingedly connected in belt form, with the cartridges serving as the link hinge pintles.

It has heretofore been the practice to form these belt links of specially treated steel, the hinge loops of the links being accurately contoured to resiliently and uniformly grip and retain the cartridges irrespective of changes in climatic conditions. In the familiar automatic machine gun, the belt is advanced by mechanism not here involved, and when each cartridge is discharged, the bullet is propelled through the gun barrel, the cartridge shell is ejected by the recoil, and the belt is progressively disassembled through loss of its hinge pintles.

The belt links heretofore used have almost universally been formed from ferrous metal alloys, the links usually being pressed to shape from sheet steel of suitable temper and other desired physical properties. The links must be formed to final contour before tempering, and the tempering operation is a critical one. Heretofore, such links have been accepted as satisfactory because the construction was the best conveniently available. Certain disadvantages, however, are attendant upon the use of links of a ferrous metal. With links of such metals, there is a normal tendency to corrosion which is accentuated under exposure to abnormal oxidizing conditions, such as use in especially humid atmosphere, or along the coast, or at sea. Electrolytic corrosion effects are developed at the hinge connections, where the cuprous metal of the cartridge is in surface contact with the ferrous metal of the clip. As a result, the flexibility of the belt is decreased and in extreme cases, the gun mechanism may become jammed, or the belt may break on the entry side of the gun, thereby at least temporarily suspending firing of the gun.

Under the conditions prevailing at the present time, ferrous metals are in great demand, and the available supply can be diverted to other essential uses whenever a particular adaptation can be taken care of, in whole or in part, by means of other less critical metals or materials.

The present invention therefore has for its primary object the provision of a link-type cartridge belt in which the links are formed of material other than ferrous metal, the links having associated therewith separate retaining means for the releasable retention of the cartridges which hingedly connect the links in belt form.

A more specific object of the present invention is the provision of a link-type cartridge belt in which the belt links are formed of material not satisfactory for uniform releasable retention of the cartridges, and in which separate means is associated with the links for such uniform releasable cartridge retention.

Some of the synthetic plastics, for example, lend themselves to fabricating operations, and are not, in the sense of the present emergency, critical from the standpoint of supply available. Efforts have been directed toward the development of a cartridge belt in which the links thereof have been made from one or another of the plastic materials. These efforts have met with failure by reason of the difficulty in achieving and maintaining dimensional accuracy for cartridge retention. It is a well known fact that the linear coefficient of thermal expansion of any of the familiar organic plastics, even at ordinary temperatures, varies anywhere up to six or seven times as much as that of brass (a common cartridge metal) for each degree increase or decrease in temperature. It is therefore obvious that a cartridge which snugly fitted its hinge socket when a belt was assembled, for example, at 70° F., might fit so loosely at 90° F. or 100° F. (ordinary tropical conditions) that the cartridge drops out altogether and the belt either breaks or, if the cartridge slips out of line any substantial amount without completely falling out, the gun is jammed. On the other hand, a similar cartridge fitted snugly at 70° F. might seize in the link hinge bores at 20° F. (ordinary winter conditions, or altitude use), so that the flexibility of the belt is lost and removal of the cartridge rendered quite difficult.

Another object of the invention is the provision of a link type cartridge belt in which the links are formed from organic plastic material by injection or equivalent molding methods, and inasmuch as the plastic links lack the dimensional stability normally required for cartridge retention, separate means are associated with said links to afford a resilient, releasable grip sufficient to retain the cartridges until their discharge.

Another object of the invention is the provision of a link type cartridge belt having separate gripping means of the character indicated, said gripping means comprising resilient elements of ring-like form suitably secured to and carried by the links.

Another object of the invention is the provision of a link type cartridge belt in which the belt links are formed from laminated plastic material in sheet form, the links being given their final contour prior to final curing of the plastic material.

Another object of the present invention is the provision of a link type cartridge belt in which each of the belt links (of a material other than ferrous metal) has one of its cartridge-receiving loops in the form of two spaced sections, and in which belt is located between the spaced loop sections of each link a resilient ring-like cartridge retaining element, said cartridge retaining elements having snap-on or equivalent connection with said links prior to the insertion of the cartridges through said retaining elements and after the ejection of the cartridges from said retaining elements.

Other features and advantages of the present invention are in part obvious and in part will be evident from the following description of several embodiments of the invention, reference being had to the accompanying drawings, wherein Fig. 1 is a side elevation, broken away at the left and right, of a portion of a flexible cartridge belt such as herein described;

Fig. 2 is a perspective view of a single belt link, and a resilient cartridge retaining element carried thereby;

Fig. 3 is a vertical section through several adjoining belt links, parts being broken away, and the cartridges being shown in elevation;

Fig. 4 is a section generally similar to Fig. 3, but showing a modified form of cartridge retaining element.

Fig. 5 is a perspective view of the cartridge retaining element shown in Fig. 4;

Fig. 6 is a section generally similar to Figs. 3 and 4 but showing still another form of cartridge retaining element;

Fig. 7 is a horizontal section taken on the line 7—7 of Fig. 6;

Fig. 8 is a perspective view of the cartridge retaining element shown in Figs. 6 and 7;

Fig. 9 is a vertical section through several adjoining belt links, parts being broken away, showing a further form of cartridge retaining element.

Fig. 10 is a horizontal section taken on the line 10—10 of Fig. 9;

Fig. 11 is a perspective view of the cartridge retaining element shown in Figs. 9 and 10;

Fig. 12 is a longitudinal sectional view, on the line 12—12 of Fig. 13, of a belt link showing a further form of cartridge holding element, the element being arranged between the spaced sections of one of the cartridge-receiving loops of the link and having snap-on connection with said link;

Fig. 13 is a cross-sectional view of the link and cartridge retaining element of Fig. 12, the view being on the line 13—13 of Fig. 12;

Fig. 14 is a longitudinal sectional view generally similar to Fig. 9 and showing several adjoining belt links, of the character illustrated in Figs. 12 and 13, in assembled relation;

Fig. 15 is a detail cross-sectional view on the line 15—15 of Fig. 14;

Fig. 16 is a plan view of a blank formed from laminated plastic material, the blank being slotted preparatory to its formation into a cartridge-receiving link;

Fig. 17 is a perspective view of the laminated cartridge-receiving link after the forming and curing operation;

Fig. 18 is a longitudinal sectional view generally similar to Fig. 12 and showing several adjoining belt links of slightly modified form, with which are associated cartridge retaining elements of the general character illustrated in Figs. 12 to 15 inclusive; and Fig. 19 is a detail cross-sectional view on the line 19—19 of Fig. 18.

Before the embodiments of the present invention here illustrated are described in detail, it is to be understood that the invention here involved is not limited to the details of construction or the specific arrangement of parts herein illustrated or described, as the invention obviously may take various forms. It also is to be understood that the phraseology or terminology herein employed is for the purpose of description and not of limitation, the scope of the present invention being defined in the appended claims.

Referring now to the drawings, Fig. 1 shows a fragmentary portion of a flexible cartridge belt composed of a series of links 20 which carry cartridges 21. One such link 20 is shown in perspective in Fig. 2, and comprises two spaced axially aligned cartridge-receiving loops 22 and 23 on one side of a body portion 24, and a single cartridge-receiving loop 25 on the other side of said body portion. Loops 22 and 23 are spaced apart to an extent sufficient to permit insertion therebetween of the loop 25 of the adjoining link, as best shown in Figs. 1 or 3. Each of loops 22, 23 and 25 has an axial bore of cross-sectional area and contour suitable to receive a cartridge 21 when the loops are aligned and said cartridge is inserted axially through the three loops. In such arrangement, the cartridge serves as a hinge pintle, and the belt flexes freely around an axis at each cartridge.

The description thus far is applicable to flexible cartridge belts heretofore known and used. In the embodiment shown in Figs. 1 to 3, however, each of the links 20 is formed from one of the well-known and readily available synthetic plastics, such as cellulose acetate. As heretofore noted, plastic materials are inferior to steel with respect to dimensional stability under temperature variations so that the frictional grip of one or more of the link loops 22, 23 or 25 on a cartridge is unreliable under extremes of temperature. To correct this deficiency, the belt links have associated therewith separate cartridge retaining elements of resilient character which releasably grip the cartridges independently of the frictional relationship of the cartridges to the link loops.

In the embodiment of the invention shown in Figs. 1, 2 and 3, the cartridge retaining elements associated with the belt links 20 are in the form of spring rings 26, there being one such ring associated with each belt link 20. As will be evident from Fig. 2, the ring of each link lies below the cartridge-receiving loop 25 thereof, in position to receive the cartridge 21 which serves as the hinge pintle for the pivotal connection of that link loop to the spaced loops 22 and 23 of the adjoining belt link. As will be evident from Figs. 1 and 3, the space 27 between the loops 22 and 23 of each link is of sufficient extent to not only receive the loop 25 of the adjoining link, but also, the cartridge retaining ring 26. Each cartridge 21 thus extends through three axially alinged loops of two adjacent links, with the consequent pivotal or hinge connection of such links, and through a retaining ring 26, which is forcibly expanded by the cartridge to an extent necessary to insure proper retention of the cartridge. The cartridge is inserted, nose first, until its definitely tapered surface portion 28 nests within the correspondingly tapered surface 29 of the bore of the upper link loop 22.

Inasmuch as each ring 26, in an assembled belt, lies between the loop 25 of one link and the loop 23 of the adjacent link, escape of the ring is impossible, so that it need not be secured to either link for the releasable retention of the cartridge which hingedly connects said two links. However, to prevent said ring from flying into the gun mechanism, and possibly fouling the gun, when the cartridge which such ring embraces is ejected from the link loops by the gun recoil, each of the cartridge retaining rings 26 is suitably anchored to a belt link. As here shown (see Fig. 2), each ring is transversely split and one of the ends thereof is extended radially outwardly, as at 30, and then normally to the plane of the ring to provide an anchoring end portion 31. In the body portion 24 of each link is suitably formed a cavity or socket for the reception of a ring anchoring portion 31, such portion being pressed into said cavity or socket and frictionally retained therein, as will be readily understood. If desired, the anchoring end portions 31 of the retaining rings 26 may be provided with surface burrs or the like to assist in their retention in the link cavities or sockets. When the links are progressively freed from the belt, by removal of the cartridges which constitutes their hinge pintles, the rings secured to the link remain in association therewith so that there is no danger of the retaining rings flying about as the belt is progressively disassembled in use thereof.

From a consideration of Figs. 1 and 3, it is apparent that a cartridge may fit loosely in one or all of the link loops through which it extends, but will nevertheless be retained in position by the spring-like grip thereon of the split metal ring 26. Indeed, the loose fit of the cartridge in the link loops is actually advantageous, as it permits free hinge action and flexure of the belt both laterally and transversely of its longitudinal plane of motion. As will be evident from Figs. 1 and 3, the inner peripheries of the axial bores of the link loops 25 are of convex form as viewed in vertical section. This permits the cartridges 21 to have a more or less rocking action in the belt links, with the resultant desired flexibility. While the spring ring 26 insures a positive grip of the cartridge, the recoil incident upon discharge of a cartridge frees the cartridge from the ring (and from the link loops), and as the cartridges of the belt are ejected, the belt progressively disintegrates by successive disassembly of its links. Even though the cartridge gripping rings 26 may be made of steel, the small gripping area between each ring and the cartridge gripped, thereby eliminates the danger of corrosion seizure, and the hinge action of the belt cannot be impaired by corrosion as it works on a plastic-to-metal contact.

Figs. 4 and 5 illustrate another embodiment of the invention, one wherein the cartridge retaining elements are of slightly modified form and wherein their securement to the belt links is effected in a slightly different manner. As will be evident from Fig. 4, there is a spring ring 32 for each of the belt links 20, said ring being located below the cartridge-receiving loop 25 thereof, in the same manner as each of the rings 26 of the embodiment of the invention illustrated in Figs. 1 to 3 inclusive. For the securement of the cartridge retaining rings 32 of Figs. 4 and 5 to the belt links 20, each such ring has projecting from one of its ends a radially disposed portion 33 inclined from the plane of the ring and terminating in an anchoring portion 34 normal to the ring plane, as clearly shown in Fig. 5. In the body portion 24 of each link is a passageway 35 leading from a point just below the loop 25 of such link to the space 27 between the two axially aligned loops 22 and 23. This passageway 35 is sufficiently oversized to permit the forcible insertion therethrough of the projecting portions 33 and 34 of a ring 32, said portions being resiliently deformable by reason of the spring characteristics thereof. As best shown in Fig. 4, the anchoring end portion 34 of each ring 32 lies within the space 27 of the link with which such ring is associated, being disposed between the body portion 24 of said link and the loop 25 of the adjacent link.

In the embodiments so far described, the resilient cartridge retaining rings are anchored to the belt links by providing such links with cavities or sockets for the frictional securement of projecting portions of the rings or with passageways through which extend projecting portions of said rings. In the further embodiments now to be described, the necessity of providing such cavities or passageways in the links is avoided by forming the spring-like retaining rings with portions which snap onto or grip portions of the links so as to be retainable thereon in cartridge holding position.

Figs. 6, 7 and 8 show an embodiment of the invention wherein alternate links of the belt are provided with retaining elements for the cartridges. As best shown in Fig. 8, each such retaining element comprising two laterally spaced cartridge retaining spring rings 40 and 41, said rings being connected by two substantially upright and generally parallel leg portions 43 and 44 which in turn are bridged by a cross portion 45. When assembled with the belt link 20 by which it is carried (see Figs. 6 and 7), each such retaining element has its ring 40 located just above the loop 23 of such link and its ring 41 located just below the loop 25 thereof. The leg portions 43 and 44 of said retaining element lie alongside and resiliently grip the body portion 24 of the link, with the bridging portion 45 lying above such body portion, as shown. As in the embodiments of the invention heretofore described, there is in this embodiment a cartridge retaining ring between the cartridge-receiving loop 23 of each link and the cartridge-receiving loop 25 of the adjacent link. Moreover, the cartridge retaining elements of this embodiment, like the cartridge retaining elements 26 and 32 heretofore described, are link carried, so that the assembly of the links and retaining elements is not only easily effected but also, there is no liability of the retaining elements flying around and fouling the gun as the belt is progressively disassembled in use thereof.

Figs. 9, 10 and 11 illustrate an embodiment of the invention wherein are used single cartridge retaining elements which are secured to the links in substantially the same manner as the double cartridge retaining elements of Figs. 6, 7 and 8. As best shown in Fig. 11, each of the single cartridge retaining elements of Figs. 9 to 11 inclusive comprises a spring ring 50 for cartridge retention and a pair of generally parallel and substantially upright leg portions 51 and 52 for gripping relationship with the body portion 24 of the link by which it is carried, said leg portions being bridged by a cross portion 53 adapted to lie just above said link body portion, as shown. As before, the ring 50 lies between the cartridge-receiving loop 23 of one link and the cartridge-receiving loop 25 of the adjacent link. In this embodiment of the invention, just as in the first two described embodiments (but unlike the embodiment of Figs. 6 to 8 inclusive), each of the belt links carries a cartridge retaining element secured thereto.

Figs. 12 to 15 inclusive illustrate a further embodiment of the invention wherein the cartridge-receiving loop 25 of each link 20 is in the form of two spaced sections 55 and 56. Located in the slot 57 between such loop sections is a resilient cartridge retaining element 58 of split-ring form. As best shown in Fig. 13, the slot 57 extends from one side of the link body portion 24 around the loop 25 to the other side of the link body portion with the consequent provision of opposed shoulders 59 and 60 at the ends of said slot. Prior to the insertion of a cartridge 21 through said retaining ring and after the ejection of the cartridge from said ring by the gun recoil, the ends of the ring 58 frictionally grip the opposed link shoulders 59 and 60, as shown in Figs. 12 and 13, the ring at such times being somewhat eccentrically disposed relative to the axis of the link loop sections 55 and 56, as shown in Fig. 13. When the rings 58 are in retaining relationship with the cartridge 21, as in Figs. 14 and 15, said rings are concentrically related to the link sections 55 and 56, and the ends of said rings are slightly spaced from the link shoulders 59, 60 as shown and as will be readily understood. If desired and as here shown, the cartridge retaining rings 58 may fit more or less snugly in the link slots 57 thus aiding in the maintenance of the rings in assembly with the links both prior to the insertion of the cartridges and after their ejection. However, the snap-on connection of the rings to the links, by the frictional engagement of the ends of the rings with the link shoulders 59 and 60, is sufficient to normally maintain such assembly. When the belt links are in assembled inter-fitting relationship, with the cartridges 21 serving as the link hinge pintles, the rings are securely maintained in place and then escape from the links is impossible.

In the embodiments of the invention so far described, the belt links have been made of organic plastic material of the type readily formed by any of the standard plastic molding methods, such as the well-known injection molding method. In Fig. 17 is illustrated a belt link 62 which is made of laminated plastic material, the blank from which such link is made (see Fig. 16) being suitably slotted and bent into link form before the final curing of the plastic occurs.

As will be evident from Fig. 16, the blank 63, from which is formed the belt link 62, is a flat, generally rectangular blank formed by heat and pressure from superposed layers of fibrous or fabric-like material impregnated with a plastic, such as a plastic of the phenol-formaldehyde type, for example. While the plastic is still in a preliminary curing stage, the blank is longitudinally slotted from opposite ends thereof, the two upper slots 64 being slightly narrower than the two lower slots 65, as here shown. This slotting of the blank provides it with two top longitudinally disposed strap portions 66 which form the upper cartridge-receiving loop 22a, with two bottom longitudinally disposed strap portions 67 which form the bottom cartridge-receiving loop 23a (in axial alignment with said upper loop 22a), and with two intermediate longitudinally disposed strap portions 68 which form the intermediate loop 25a, said intermediate loop lying opposite the space between the axially aligned loops 22a and 23a. To form the blank into a link, the top and bottom strap portions 66 and 67 are bent around a suitable mandrel or core (not shown), of such size as to bring into abutting relationship the ends of the top pair of strap portions 66 and into corresponding abutting relationship the ends of the bottom pair of strap portions 67. The pair of intermediate strap portions 68 are bent in the opposite direction around a second mandrel or core (not shown) of such size as to bring into abutting relationship the ends of said strap portions. With the three pairs of strap portions held in such position, the blank is subjected to further heat and pressure, the effect of which is a final curing of the plastic and a welding, in a butt joint manner, of the ends of each pair of strap portions. The mandrels or cores are suitably shaped, of course, to produce the proper contour in the bores of the cartridge-receiving loops of the links, as will be readily understood. By making the lower pair of slots 65 somewhat wider than the upper pair of slots 64, the space between the axially aligned link loops 22a and 23a is given sufficient depth to receive not only the loop 25a of an adjacent link but also, a retaining ring for cartridge retention. The securement of such ring to a belt link, if such securement is desired, may be effected in any suitable manner evident from the foregoing embodiments of the invention. By transversely slotting the loop 25a of each of the links 62, either before or after the final lubricating step, the cartridge-retaining ring of said link may be secured thereto in generally the manner shown in Figs. 12 to 15 inclusive. In other words, the loops 25a of such links may be of spaced sectional form, with the retaining rings in the slots between such loop sections.

In the foregoing embodiments of the present invention, each of the belt links has been of the type having two spaced and axially aligned cartridge-receiving loops on one side of its body portion, and a single cartridge-receiving loop (or a loop of two closely spaced sections, as in Figs. 12 to 15 inclusive) on the other side of its body portion and opposite the space between the two axially aligned loops. In order to increase the strength and durability of the links, especially links made of organic plastic material, such as cellulose acetate and the like, the links may be made in the form illustrated in Figs. 18 and 19. As there shown, each of the links 20b is provided on one side of its body portion 24b with three spaced and axially aligned cartridge-receiving loops 71, 72 and 73, and on the opposite side of its body portion with two spaced and axially aligned cartridge-receiving loops 75 and 76. The spacing of the two sets of loops is such that the loop 75 on one side is opposite the space between the loops 71 and 72 on the other side, and the loop 76 is opposite the space between the loops 72 and 73. Thus, when the links are assembled in a belt, as in Figs. 18 and 19, the loops 75 and 76 of each link are interfitted and in axial alignment with the links 71, 72 and 73 of the adjoining link. As before, the cartridges 21 extending through the axially aligned loops of the belt links serve as hinge pintles for the links, as will be readily understood.

Although the resilient cartridge retaining elements used with links of this five loop type may take various forms, as will be evident from the previously described embodiments, the cartridge retaining elements here used with the links 20b of Figs. 18 and 19 are of the form illustrated in Figs. 12 to 15 inclusive, and their securement to such links is effected in generally the manner there shown. In other words, the cartridge retaining elements used with the links 20b are of open spring ring form, the ends of said rings having snap-on connection with the links. As here shown, the middle loop 72 of each link is of two sectional character, and in the slot between the two sections of such loop is arranged an open spring ring 58 for cartridge retention purposes. As best shown in Fig. 19, the ends of such ring, both prior to the insertion of a cartridge through said ring and after its ejection therefrom, have frictional clamping engagement with opposed link shoulders at the ends of the loop slot in which such ring is located, in substantially the same manner shown in Figs. 12 to 15 inclusive.

Resilient cartridge gripping elements such as described herein also may be used with links made of corrosion-resistant metals, such as nonferrous metals or alloys. Metals such as aluminum and magnesium have desirable low specific gravities but lack the necessary resiliency for proper cartridge retention.

Metals such as zinc have good die casting properties but also lack resiliency. These or other nonferrous metals may be used for the belt links, in conjunction with resilient cartridge retaining ring-like means such as herein described, it being only necessary for any link material used to meet the general strength requirements without regard to resiliency. Such requirements are not exacting and may be met by a large number of nonferrous metals and by most plastics.

To those skilled in the art to which the present invention relates, further features and advantages of the invention will be evident from the foregoing description of several embodiments thereof.

What I claim is:

1. A cartridge belt, comprising a plurality of links, each having two oppositely extending loops, the adjacent loops of adjacent links being in axial alignment, a cartridge in each pair of axially aligned link loops, the cartridges constituting hinge pintles for the flexible connection of the links, and resilient retaining elements carried by alternate links for the releasable retention of the cartridges in the axially aligned link loops, each such retaining element having two oppositely extending cartridge-receiving ring-like parts in axial alignment with the two oppositely extending loops of the link by which such element is carried.

2. A cartridge belt, comprising a plurality of links, each having two oppositely extending loops, the adjacent loops of adjacent links being in axial alignment, a cartridge in each pair of axially aligned loops, the cartridges constituting hinge pintles for the flexible connection of the links, one of the loops of each pair of axially aligned loops having two opposed shoulders, and resilient elements of open ring form for the reception and releasable retention of the cartridges in the axially aligned link loops, there being one such element associated and in alignment with each shouldered loop, the ends of such elements, prior to their reception of cartridges, having clamping engagement with the shoulders of the shoulder loops, whereby the cartridge-retaining elements are carried by the shoulder loops prior to the connection of the links in flexible belt form by the cartridges.

3. A cartridge belt, comprising a plurality of links, each having three spaced and axially aligned loops on one side thereof and two spaced and axially aligned loops on the other side thereof, the two axially aligned loops of each link being respectively opposite the spaces between the three axially aligned loops thereof, the links of the belt being arranged so that each link has its two axially aligned loops in axial alignment with the three axially aligned loops of an adjacent link, a cartridge in each set of five axially aligned loops, the cartridges serving as hinge pintles for the flexible connection of the links, one of the loops of each axially aligned set of five loops being transversely slotted, and a resilient element of ring-like form in the slot of each such slotted loop and in alignment with such loop, the resilient elements receiving and releasably retaining the cartridges in the sets of axially aligned link loops.

JAMES S. REID.

REFERENCES CITED

The following references are of record in the file of this patent:

UNITED STATES PATENTS

| Number | Name | Date |
| --- | --- | --- |
| 628,871 | Trochain | July 11, 1899 |
| 2,022,685 | Moore | Dec. 3, 1935 |
| 2,302,595 | Berry | Nov. 17, 1942 |

FOREIGN PATENTS

| Number | Country | Date |
| --- | --- | --- |
| 127,865 | Great Britain | June 19, 1919 |
| 161,320 | Great Britain | Apr. 14, 1921 |
| 312,418 | Germany | May 24, 1919 |